United States Patent
Dusserre-Telmon et al.

(10) Patent No.: US 7,143,877 B2
(45) Date of Patent: Dec. 5, 2006

(54) FUSIBLE LINK COMPRISING DAMPER AND BACKSTOP

(75) Inventors: Guy Franck Paul Dusserre-Telmon, Sivry-Courtry (FR); Gerard Etoile, Nemours (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/513,796

(22) PCT Filed: May 22, 2003

(86) PCT No.: PCT/FR03/01546

§ 371 (c)(1),
(2), (4) Date: Nov. 18, 2004

(87) PCT Pub. No.: WO03/100288

PCT Pub. Date: Dec. 4, 2003

(65) Prior Publication Data

US 2005/0236241 A1    Oct. 27, 2005

(30) Foreign Application Priority Data

May 23, 2002   (FR) .................................. 02 06257

(51) Int. Cl.
*F16F 7/12*   (2006.01)
(52) U.S. Cl. ...................... 188/376; 188/374
(58) Field of Classification Search ................ 188/371, 188/374, 376
See application file for complete search history.

(56) References Cited

U.S. PATENT DOCUMENTS

| | | | | |
|---|---|---|---|---|
| 2,391,275 A | * | 12/1945 | Shaw | ........................... 74/581 |
| 2,401,748 A | * | 6/1946 | Dillon | ..................... 244/122 B |
| 3,493,082 A | * | 2/1970 | Bell | ............................ 188/377 |
| 3,653,468 A | * | 4/1972 | Marshall | ..................... 188/375 |
| 3,819,218 A | | 6/1974 | Liu | |
| 4,066,149 A | * | 1/1978 | Mazelsky | .................... 188/372 |
| 4,341,291 A | | 7/1982 | Flory et al. | |
| 4,361,212 A | * | 11/1982 | Bolang et al. | .............. 188/377 |
| 4,537,374 A | * | 8/1985 | Barnoin et al. | ......... 244/102 R |
| 5,090,755 A | * | 2/1992 | Garnweidner | ............... 293/133 |
| 5,403,113 A | * | 4/1995 | Gertz et al. | ..................... 404/6 |
| 5,458,221 A | * | 10/1995 | Flux et al. | ................... 188/374 |
| 6,086,059 A | * | 7/2000 | Runesson et al. | ......... 267/64.11 |
| 6,708,761 B1 | * | 3/2004 | George et al. | .............. 166/297 |
| 6,715,746 B1 | * | 4/2004 | Bachmeyer et al. | ......... 267/294 |

FOREIGN PATENT DOCUMENTS

| | | |
|---|---|---|
| FR | 2 360 819 | 3/1978 |
| FR | 2 795 793 | 1/2001 |
| GB | 2 236 573 | 4/1991 |

* cited by examiner

*Primary Examiner*—Robert A. Siconolfi
(74) *Attorney, Agent, or Firm*—Oblon, Spivak, McClelland, Maier & Neustadt, P.C.

(57) ABSTRACT

A link including a rod with a connection member at each end with an axis passing through both connection members. The rod includes a fusible zone as a narrow section lying between a first rod portion connected to a first connection member and a second rod portion connected to a second connection member. The fusible zone breaks when tensile force to which the link is subjected is greater than a predetermined value. The two rod portions are inseparable in event of the fusible zone breaking by a cylinder coaxial about the axis and secured to the first rod portion, and having an end wall through which the second rod portion passes. The second rod portion includes a collar that can slide into the cylinder if the fusible zone breaks. The inside wall of the cylinder includes teeth configured to be broken by the collar if the fusible zone breaks.

14 Claims, 3 Drawing Sheets

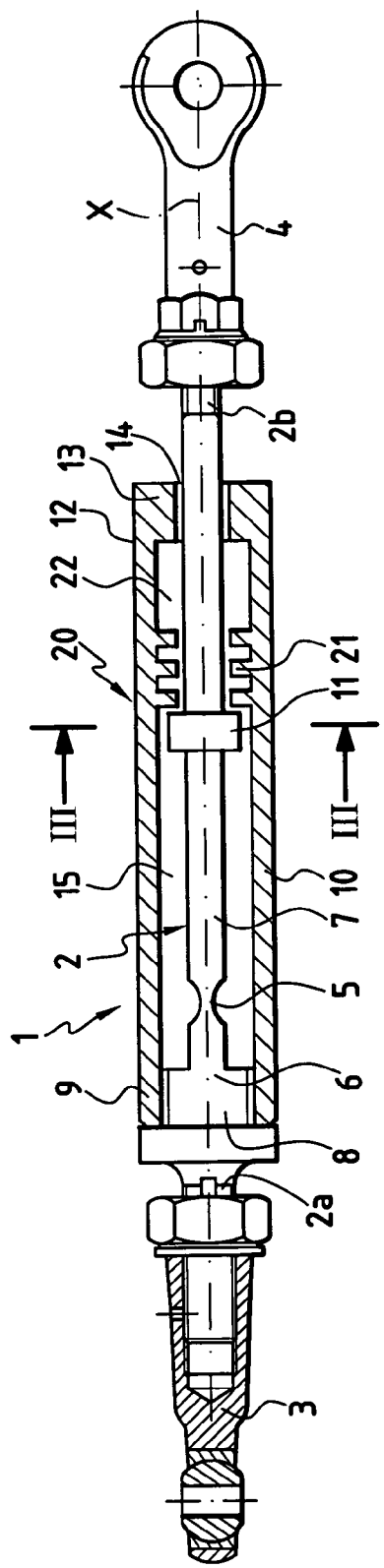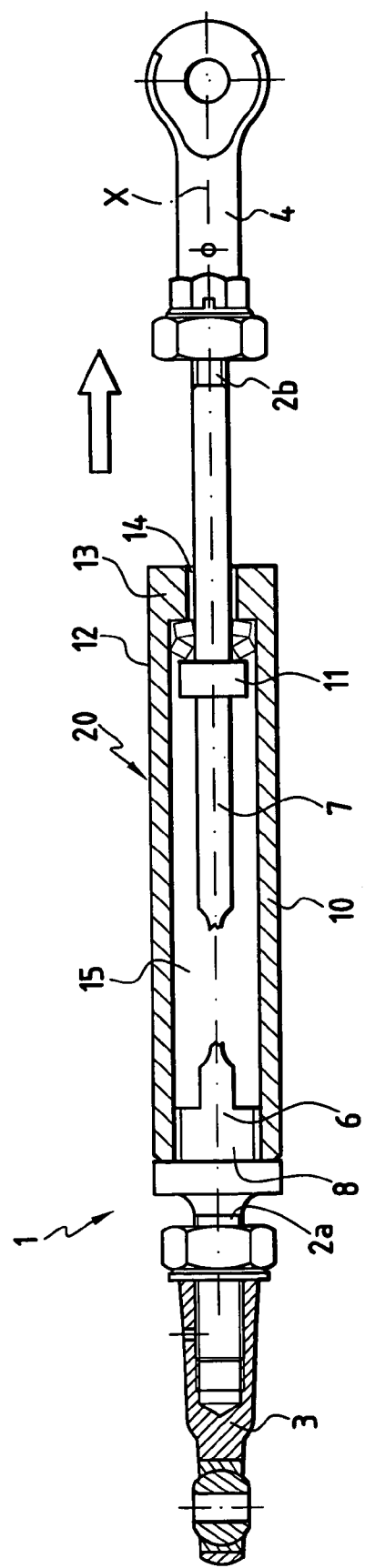

FUSIBLE LINK COMPRISING DAMPER AND BACKSTOP

The invention refers to the links that serve to interconnect two structural elements.

The invention relates more precisely to a link comprising a rod which has a connection member at each end, with an axis X passing through both connection members.

It is known, particularly in aviation, to connect two structural elements together by means of links. Such links must be both lightweight and very strong, both in traction and in compression.

Any impact on the structural element subjects the link to a stress peak. In order to avoid destruction of the structural elements, which are difficult to repair, it is preferable for the link to absorb shock above a determined stress threshold either through plastic deformation or quite simply by breaking. But, if it does break, the two elements now separated by the link go out of control and may cause damage to nearby parts and, moreover, the link no longer fulfils its role.

FR 2 795 793 defines an energy-absorbing fusible link which comprises two coaxial elements, that is, a cylinder with a connection member at one end, and a rod connected to the second connection member, which comprises a collar housed in a cylindrical cavity in the cylinder, two fusible sleeves surrounding the rod being arranged on either side of the collar, bearing against an end wall of the cylinder and a face of the collar. That link thus includes respective fusible members in the traction direction and in the compression direction. In order to adjust the strength of each of said fusible members, which are formed by respective sleeves, each sleeve includes a plurality of elongate slots lying parallel to the axis of the link. In order to ensure that the two elements are parallel after a sleeve has buckled, the cylinder has a cylindrical bearing surface beside its connection member into which the free end of the rod can slide. The cylinder thus includes a solid portion, which increases the weight of the link. Moreover, the fusible members are voluminous and require a large amount of machining to make the slots.

The object of the invention is to provide a conventional type of link which is capable of breaking without damaging the surrounding parts when, following an impact, the tensile force is greater than a predetermined value, and which is still capable of performing its connection role after breaking, without an excessive increase of weight.

Therefore, the invention relates to a link comprising a rod having a connection member at each end, with an axis X passing through both connection members.

According to the invention, the link is characterized by the fact that the rod includes a fusible zone in the form of a narrow section lying between a first rod portion connected to a first connection member and a second rod portion connected to the second connection member, said fusible zone being intended to break when the tensile force to which said link is subjected is greater than a predetermined value, and further includes means for making the two rod portions inseparable in the event of the fusible zone breaking.

Most advantageously, the means for making the two rod portions inseparable comprise a cylinder body coaxial about the axis X and secured at one end to the first rod portion, said cylinder body presenting at its other end an end wall in which an orifice has been made through which the second rod portion is capable of sliding, said cylinder body defining a cylindrical cavity in which the fusible zone is housed, together with a collar formed around the second rod portion and capable of sliding in said cavity.

Hence, in the event of the fusible zone breaking, the second rod portion is held coaxially in the cylinder, and its axial movement is limited by the end wall of the cylinder against which the collar is capable of coming into abutment.

Preferably, the link further comprises mechanical means for absorbing the shock in the event of the fusible zone breaking.

By way of example, these mechanical means comprise a plurality of teeth formed on the inside wall of the cylinder body in the annular chamber defined by the collar and by the end wall of the cylinder body, said teeth being capable of being broken by the collar following the breaking of the fusible zone.

Advantageously, the link also includes means for preventing the return movement of the second rod portion after the fusible zone has broken.

These anti-return means pertaining to the second rod portion preferably comprise at least a first tooth formed on the inside wall of the cylinder body and facing a helical groove made in the periphery of the collar, co-operation between said first tooth and said groove immediately after the fusible zone has broken causing at least one of the rod portions to become twisted, said first tooth forming an anti-return abutment after the collar has moved past it as a consequence of the rod portions turning in opposite directions by the elastic effect.

Other advantages and characteristics of the invention appear on reading the following description given by way of example and with reference to the accompanying figures, in which:

FIG. 1 is a longitudinal section of a link of the invention;

FIG. 2 is a longitudinal section of the link in FIG. 1, after the fusible zone has broken;

Figure 3:
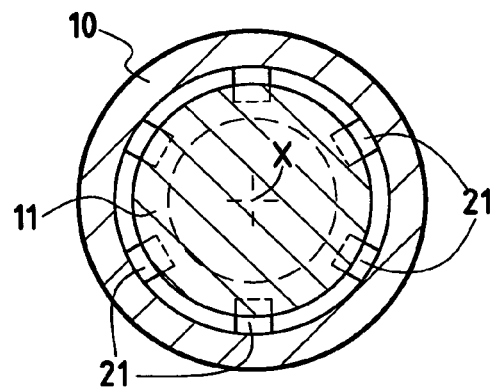
FIG. 3 is a cross-section of the cylinder body on line III—III in FIG. 1.

FIGS. 1 and 2 show a link 1 which comprises a rod 2 of axis X, said rod having respective connection members 3 and 4 at each of its ends 2a and 2b.

The connection members 2a and 2b are of the ball-and-socket type with axes perpendicular to the axis X.

The rod 2 includes a narrow section forming a fusible zone between a first rod portion 6 situated beside the first connection member 3 and a second rod portion 7 situated beside the second connection member 4. The fusible zone 5 is intended to break when the tensile force borne by the link 1 is greater than a predetermined value, for example as a result of an impact on one of the structural elements connected together by the link 1.

The first rod portion 6 is much shorter than the second rod portion 7, and near its end 2a it has an annular swelling 8, which is threaded on its periphery, said annular swelling being intended to receive the end 9 of a cylinder 10 of axis X.

In its middle zone, the second rod portion 7 presents a collar 11 of axis X, with a diameter which is slightly smaller than that of the annular swelling 8.

The cylinder 10 encases the rod 2 over practically its entire length. At its end 9, said cylinder has an inside thread which cooperates with the outside thread of the annular swelling 8. The inside diameter of the cylinder is greater than the diameter of the rod 2 and slightly greater than that of the collar 11. At its other end 12, said cylinder has an end wall 13 which presents an orifice 14 of axis X through which the second rod portion 7 passes. The end wall 13 is sufficiently rigid to withstand an impact when the fusible zone 5 is broken, and the orifice 14 is capable of acting as a cylindrical bearing surface for the second rod portion 7.

The cylinder 10 defines an inside cavity 15 in which the fusible zone 5 and the collar 11 are housed. The fusible zone 5 is situated near the end 9 of the cylinder 10 and the collar 11 is positioned substantially midway between the fusible zone 5 and the end wall 13 of the cylinder 9.

In the event of the fusible zone 5 being broken, the inside wall of the cylinder 10 constitutes a cylindrical bearing surface for the collar 11.

Therefore, if the link 1 is subjected to a tensile force greater than a predetermined force, then the above-described link structure gives control over the exact place where the rod 2 breaks, due to the narrow section in the fusible zone 5. In the event of the fusible zone 5 breaking, the two rod portions 6 and 7 are caused to be inseparable by the presence of the cylinder 10 secured at one end 9 to the first rod portion 7, and by the presence of the collar 11 trapped in the cavity 15 inside the cylinder 10. The amplitude of the gap between the two separated rod portions 6 and 7 is also limited because the collar 11 slides into the cylinder 10 like a piston.

Very advantageously, the link 1 described above also includes mechanical means 20 for absorbing the shock after the fusible zone 5 has been broken.

These mechanical means 20 are made in the form of spikes or teeth 21 provided on the inside wall of the cylinder 10 in the chamber 22 defined by the collar 11 and the end wall 13 of the cylinder 10.

Preferably, the teeth 21 are spread over one or more spirals inside the chamber 22 beside the collar 11. The teeth 21 are long enough to be sheared by the collar 11 when it moves after the fusible zone 5 has broken.

In the event of the fusible zone 5 breaking, the teeth 21 will be broken one after the other, i.e., the teeth that are nearest the collar 11 when the link 1 is in the normal position will be broken first. This disposition makes it possible for at least some of the energy released by the fusible zone 5 breaking to be absorbed progressively.

The broken teeth 21 remain trapped inside the chamber 22, and if the energy released by the fusible zone 5 breaking is sufficient to break all of the teeth 21, then the collar 11 will compress the broken teeth 21 against the end wall 13 of the cylinder 10 until all the remaining energy has been absorbed. Subsequently, the collar 11 will be free to move inside the cylinder 10 as a function of the direction of the force being exerted on the connection members 3 and 4.

Figure 4:
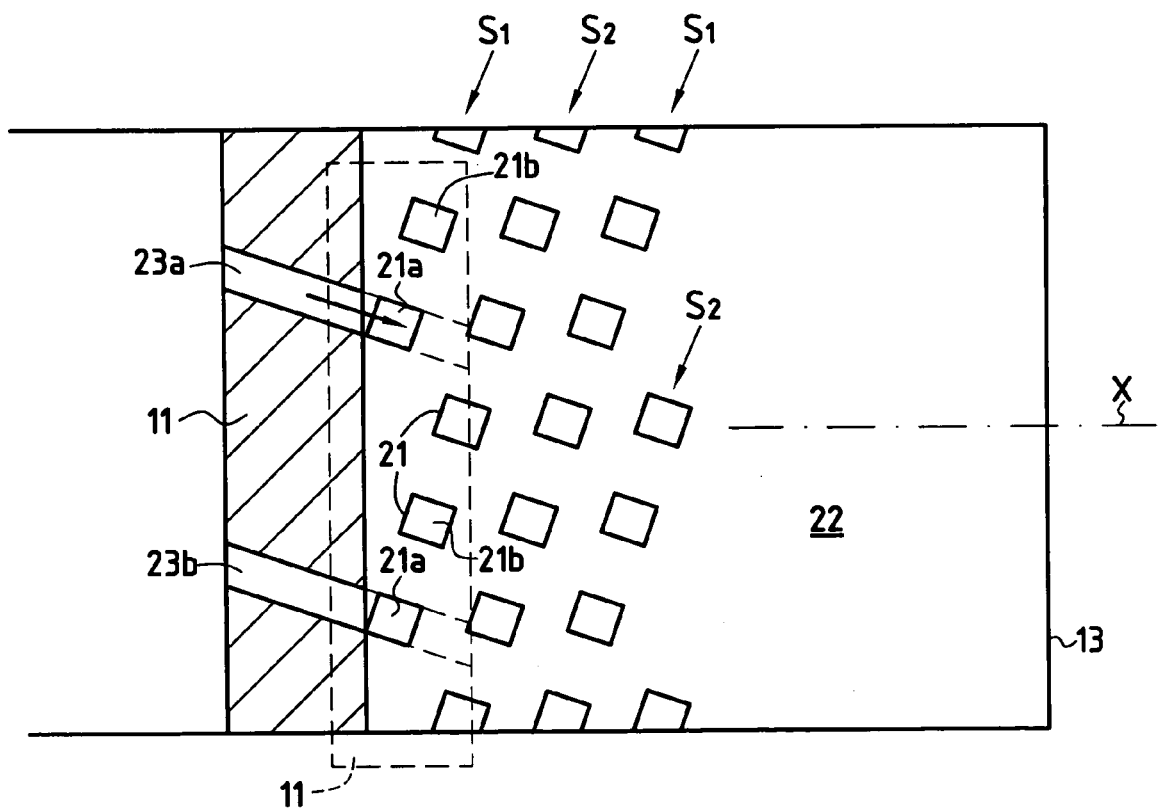
FIG. 4 is a developed view of a link which includes anti-return means and it shows the arrangement of the teeth on the inside surface of the cylinder together with the periphery of the collar before the fusible zone has broken.
Figure 5:
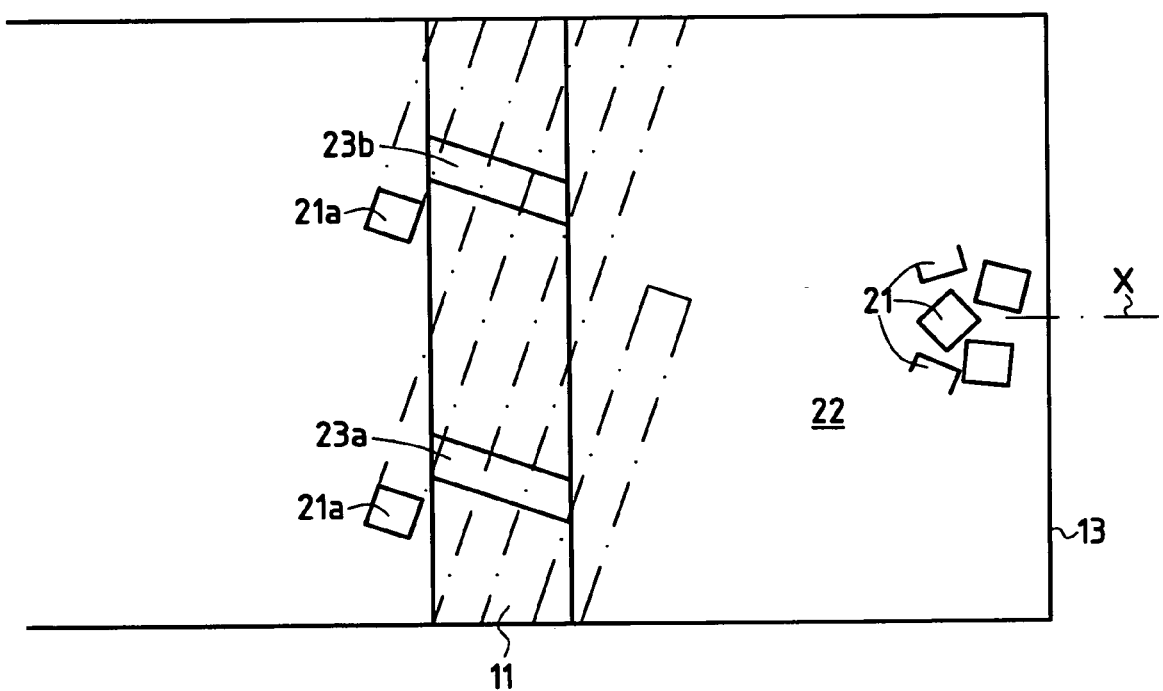
FIG. 5 is similar to FIG. 4 and shows the position of the collar after the fusible zone has broken.

FIGS. 4 and 5 are developed views of the inside wall of the cylinder 10, said wall having two spirals S1, S2 of diametrically-opposite teeth 21, each spiral S1, S2 comprising a turn and a half, for example, and the two spirals S1 and S2 being diametrically opposite.

When the fusible zone 5 breaks, the collar 11 which, initially and prior to the break, is in the region of the first teeth 21a of the two spirals S1 and S2, will break, said teeth 21a, then break the second teeth 21b of each spiral, and so on.

FIGS. 4 and 5 show that, in one embodiment of the invention, the periphery of the collar 11 includes two, diametrically-opposite, helical grooves referenced 23a and 23b, which open out into the chamber 22 facing the first teeth 21a and 21b of the two spirals S1 and S2.

When the fusible zone 5 breaks, the collar 11 moves towards the right on FIG. 4, and the "guiding" first teeth 21a, of the two spirals S1 and S2 become engaged in the helical grooves 23a and 23b, without breaking. At the beginning of its movement in translation, the collar 11 is subjected to torque which absorbs some of the energy.

During the twisting movement, the second teeth 21b, then the third teeth, and possibly the following teeth are struck by the peripheral sectors of the collar 11 situated between the helical grooves 23a and 23b and will break, thereby absorbing some of the energy.

When the collar 11 has covered a sufficient distance to be able to disengage itself from the guiding teeth 21a and 21b, it will take up its initial angular position in the cylinder 10, by a spring effect and then continue its journey towards the end wall 13 in the manner described above, being subjected to twisting movement caused by the second guiding teeth and breaking all the teeth it encounters on its path.

In this particular embodiment, the collar 11 will then be free to move inside the cylinder 10 as a function of the direction of the force being exerted on the connection members 3 and 4, but the return journey covered by the collar 11 will be limited by the guide teeth 21a and 21b, which, as can be seen in FIG. 5, serve as an abutment for the collar 11 in the compression direction, since the guiding teeth 21a and 21b are no longer in register with the helical grooves 23a and 23b.

The invention claimed is:

1. A link comprising:
   a rod having a connection member at each end with an axis going through both connection members, wherein said rod includes a fusible zone in a form of a narrow section lying between a first rod portion connected to a first of the connection members and a second rod portion connected to a second of the connection members, said fusible zone configured to break when tensile force to which said link is subjected is greater than a predetermined value;
   a body coaxial about said axis and secured at one end to the first rod portion, said body presenting at its other end an end wall having an orifice through which the second rod portion is capable of sliding, said body defining a cavity in which the fusible zone is housed, together with a collar formed around the second rod portion configured to slide into said cavity in an event of the fusible zone breaking;
   a plurality of teeth formed on an inside wall of the body, said teeth being configured to be broken by the collar following breaking of the fusible zone; and
   means for preventing return movement of the second rod portion after the fusible zone has broken,
   wherein said plurality of teeth, while being broken by said collar, absorb a shock in the event of the fusible zone breaking, and
   wherein said plurality of teeth are formed on the inside wall of the body in an annular chamber defined by the collar and by the end wall of the cylinder body.

2. A link according to claim 1, wherein said body is configured so that the two rod portions are inseparable after the fusible zone breaks.

3. A link according to claim 2, wherein said teeth are spread over one or more spirals.

4. A link according to claim 1, wherein said means for preventing return movement comprises at least a first tooth different from said plurality of teeth and formed on the inside wall of the cylinder body and facing a helical groove made in a periphery of the collar, co-operation between said first tooth and said groove immediately after the fusible zone has broken causing at least one of the rod portions to become twisted, said first tooth forming an anti-return abutment after the collar has moved past it as a consequence of said rod portion turning in an opposite direction by elastic effect.

5. A link according to claim 1, wherein said teeth are spread over one or more spirals.

6. A link according to claim 4, wherein said teeth are spread over one or more spirals.

7. A link according to claim 1, wherein said body and said cavity are cylindrical.

8. A link comprising:
a rod having a connection member at each end with an axis going through both connection members, wherein said rod includes a fusible zone in a form of a narrow section lying between a first rod portion connected to a first of the connection members and a second rod portion connected to a second of the connection members, said fusible zone configured to break when tensile force to which said link is subjected is greater than a predetermined value;
a body coaxial about said axis and secured at one end to the first rod portion, said body presenting at its other end an end wall having an orifice through which the second rod portion is capable of sliding, said body defining a cavity in which the fusible zone is housed, together with a collar formed around the second rod portion configured to slide into said cavity in an event of the fusible zone breaking;
a plurality of teeth formed on an inside wall of the body, said teeth being configured to be broken by the collar following breaking of the fusible zone,
wherein said collar defines a groove.

9. A link according to claim 8, further comprising a first tooth, different from said plurality of teeth, formed on the inside wall of the body and configured to engage said groove after the fusible zone breaks.

10. A link according to claim 9, wherein said groove is helical.

11. A link according to claim 9, wherein said groove traverses said collar so that said first tooth enters said groove at one side of said collar and exits said collar at another side of said collar as said collar slides into said cavity after the fusible zone breaks.

12. A link according to claim 11, wherein said first tooth abuts against said collar after said first tooth exits said collar.

13. A link according to claim 12, further comprising a second tooth, different from said plurality of teeth, formed on the inside wall of the body and configured to engage said groove after said first tooth exits said collar.

14. A link according to claim 9, wherein said first tooth is located relative to said plurality of teeth so that said first tooth engages said groove of said collar before said collar breaks said plurality of teeth following breaking of the fusible zone.

* * * * *